United States Patent
Carreon et al.

(10) Patent No.: US 7,639,859 B2
(45) Date of Patent: Dec. 29, 2009

(54) METHOD OF OPERATING A REMOTE CHECK IMAGE CAPTURE DEVICE AND AN APPARATUS THEREFOR

(75) Inventors: Susan F. Carreon, Kitchener (CA); David W. Norris, Cambridge (CA)

(73) Assignee: NCR Corporation, Dayton, OH (US)

( * ) Notice: Subject to any disclaimer, the term of this patent is extended or adjusted under 35 U.S.C. 154(b) by 620 days.

(21) Appl. No.: 11/243,676

(22) Filed: Oct. 5, 2005

(65) Prior Publication Data

US 2007/0076941 A1 Apr. 5, 2007

(51) Int. Cl.
*G06K 9/00* (2006.01)

(52) U.S. Cl. .................................................. 382/137

(58) Field of Classification Search ............... 382/100, 382/112, 135, 137, 138, 139, 140; 705/45; 194/4; 209/534; 235/379; 356/71; 902/7
See application file for complete search history.

(56) References Cited

U.S. PATENT DOCUMENTS

| | | | |
|---|---|---|---|
| 2002/0001393 A1* | 1/2002 | Jones et al. | 382/100 |
| 2004/0218203 A1* | 11/2004 | Mastie et al. | 358/1.13 |
| 2005/0071283 A1* | 3/2005 | Randle et al. | 705/75 |
| 2006/0026511 A1* | 2/2006 | Rainero et al. | 715/523 |

* cited by examiner

*Primary Examiner*—Samir A. Ahmed
*Assistant Examiner*—Atiba O Fitzpatrick
(74) *Attorney, Agent, or Firm*—Michael Chan

(57) ABSTRACT

A method is provided of operating a remote check image capture device. The method comprises capturing a color image of a check provided by a user at the remote check image capture device, storing the color image of the check, deriving from the color image a non-color image of the check, transmitting to an institution the non-color image of the check, and receiving from the institution a request to retrieve the color image of the check in response to the institution determining that the non-color image of the check is unusable.

6 Claims, 8 Drawing Sheets

METHOD OF OPERATING A REMOTE CHECK IMAGE CAPTURE DEVICE AND AN APPARATUS THEREFOR

BACKGROUND

The present invention relates to depositing of financial instruments such as checks, and is particularly directed to a method of operating a remote check image capture device, such as an image-based check depositing automated teller machine (ATM), and an apparatus therefor.

A typical check depositing ATM allows an ATM customer to deposit a check (without having to place the check in any deposit envelope) in a public access, unattended environment. To deposit a check, an ATM customer inserts a customer identification card through a user card slot at the ATM, enters the amount of the check being deposited, and inserts the check through a check slot. A check transport mechanism receives the inserted check and transports the check in a forward direction along a check transport path to a number of locations within the ATM to process the check. If the check is not accepted for deposit, the check is returned to the ATM customer via the check slot. If the check is accepted for deposit, the amount of the check is deposited into the ATM customer's account and the check is transported to and stored in a storage bin within the ATM. An endorser printer prints an endorsement onto the check as the check is being transported to the storage bin.

Checks stored in the storage bin within the ATM are periodically (usually daily) picked up and physically transported via courier to a back office facility of a financial institution. At the back office facility, the checks are prepared at a document preparation workstation for subsequent processing in an image-based check processing system located at the back office facility. In a first pass of checks through the image-based check processing system, check image data which is representative of images of the checks is captured. Then in a second pass of checks through an image-based check processing system, the checks are encoded and sorted and matched up with their corresponding check image data which was previously captured during the first pass of checks. The second pass of checks may be made through either the same image-based check processing system that the first pass of checks was made or a different image-based check processing system. Checks are processed in the first and second passes through the image-based check processing system(s) for purpose of clearing checks between financial institutions, as is known.

As an alternative to capturing check image data in a first pass of checks through an image-based check processing system located at the back office facility (which requires the checks to be physically transported from the ATM to the back office facility before the first pass of checks can be performed), proposals have been made to initially capture check image data at the ATM. An image-based check depositing ATM is needed to capture check image data which is representative of checks deposited at the ATM. In a typical image-based check depositing ATM, check image data is initially captured in a "first pass" of checks through the ATM. The remotely-captured check image data is then sent electronically to the back office facility. At a later time (typically weekly), the checks may be picked up at the ATM and physically transported via courier to the back office facility. Then, in a "second pass" of checks through an image-based check processing system located at the back office facility, the checks are matched up with their corresponding check image data which was previously captured at the ATM. The checks are then further processed as required.

From time to time, a check image represented by check image data which has been captured in the "first pass" through the image-based check depositing ATM may be of suspect image quality. For example, after the remotely-captured check image data has been sent electronically to the back office facility, an operator at the back office facility may determine that the quality of the image represented by the check image data is of insufficient quality. If this should occur in known image-based check depositing ATMs, a service operator may need to be dispatched to the particular ATM to retrieve the particular check and process the retrieved check as an exception item through a normal exception processing infrastructure. The cost of dispatching a service operator to an ATM to retrieve a particular check, so that the retrieved check can be processed as an exception item, is usually relatively high. It would be desirable to reduce the number of service trips which need to be made by service operators to remote check image capture devices such as image-based check depositing ATMs.

SUMMARY

In accordance with an embodiment of the present invention, a method is provided of operating a remote check image capture device. The method comprises capturing a color image of a check provided by a user at the remote check image capture device, storing the color image of the check, deriving from the color image a non-color image of the check, transmitting to an institution the non-color image of the check, and receiving from the institution a request to retrieve the color image of the check in response to the institution determining that the non-color image of the check is unusable.

DETAILED DESCRIPTION

The present invention is directed to a method of operating a remote check image capture device and an apparatus therefor.

Figure 1:
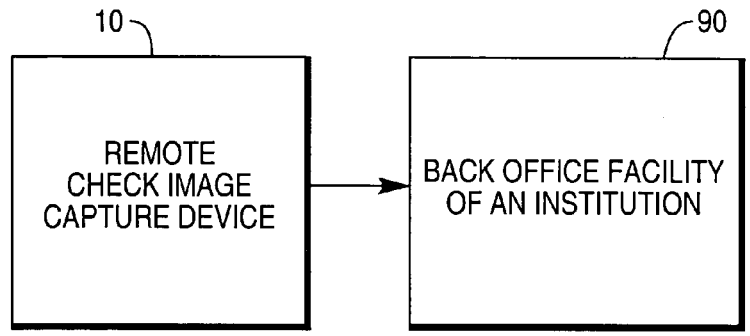
FIG. 1 is a block diagram of a remote check image capture device and a back office facility of an institution.
Figure 2:
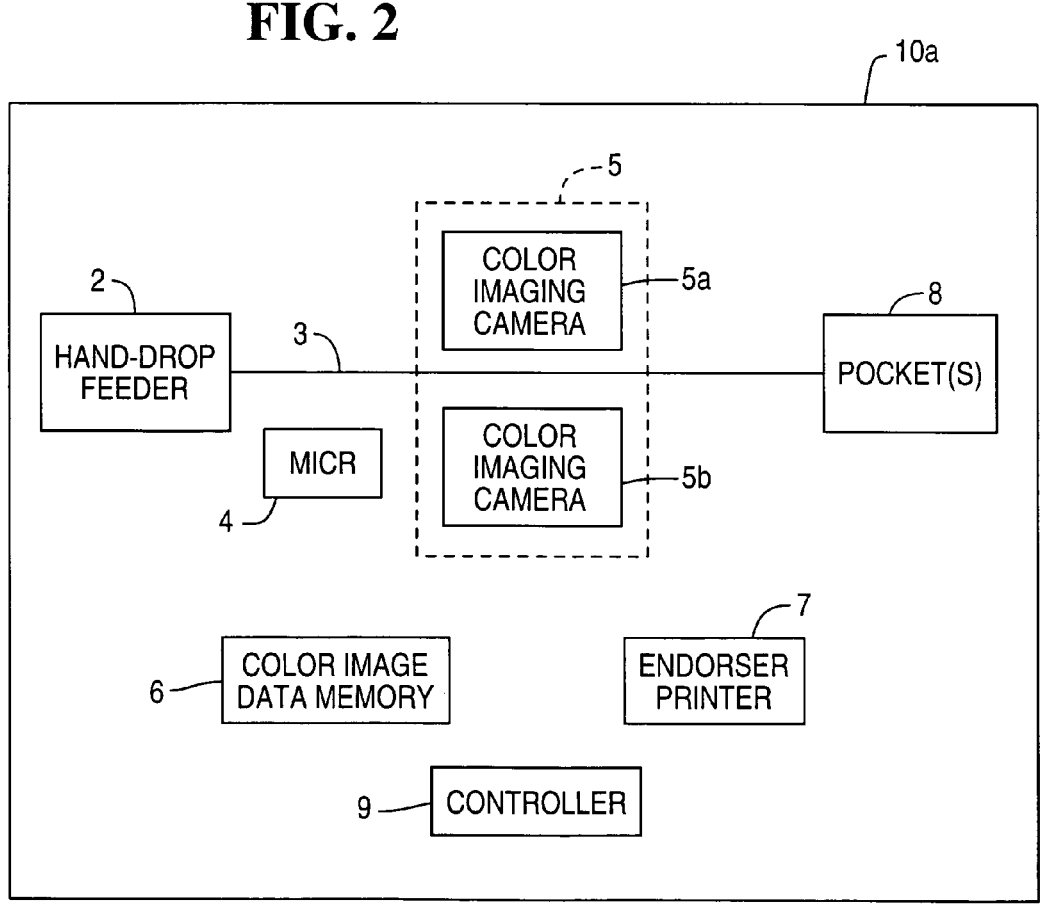
FIG. 2 is a block diagram showing one form (a table-top check processing terminal) of the remote check image capture device of FIG. 1.

Referring to FIG. 1, a back office facility 90 of an institution receives check image data from a remote check image capture device 10. There are many forms that the remote check image capture device 10 may take. One example of the remote check image capture device 10 is in the form of a table-top check processing terminal 10a as shown in FIG. 2.

The terminal 10a may be located at a bank branch, for example, where bank personnel use the terminal to perform check processing functions. As another example, the terminal 10a may be located at a merchant's office facility where check image capture processing is performed.

The table-top terminal 10a comprises the following elements: a hand-drop check feeder 2, a check transport mechanism 3 including an alignment mechanism for aligning a check; a magnetic ink recognition character (MICR) head 4 for reading magnetic details on a code line of a check; a color imager 5 including a first color imaging camera 5a and a second color imaging camera 5b for capturing a color image of each side of a check (front and rear); a color check image data memory 6 for storing color images of checks; a printer 7 for endorsing a check; and a number of check storage bins 8 in the form of pockets for storing processed checks. An automated check feeder may be used instead of the hand-drop check feeder 2. Also, the use of the MICR head 4 in some applications may be optional. The elements are conventional and will not be described in detail herein. The terminal 10a also includes a controller 9 for controlling the operation of the elements within the terminal.

Figure 3:
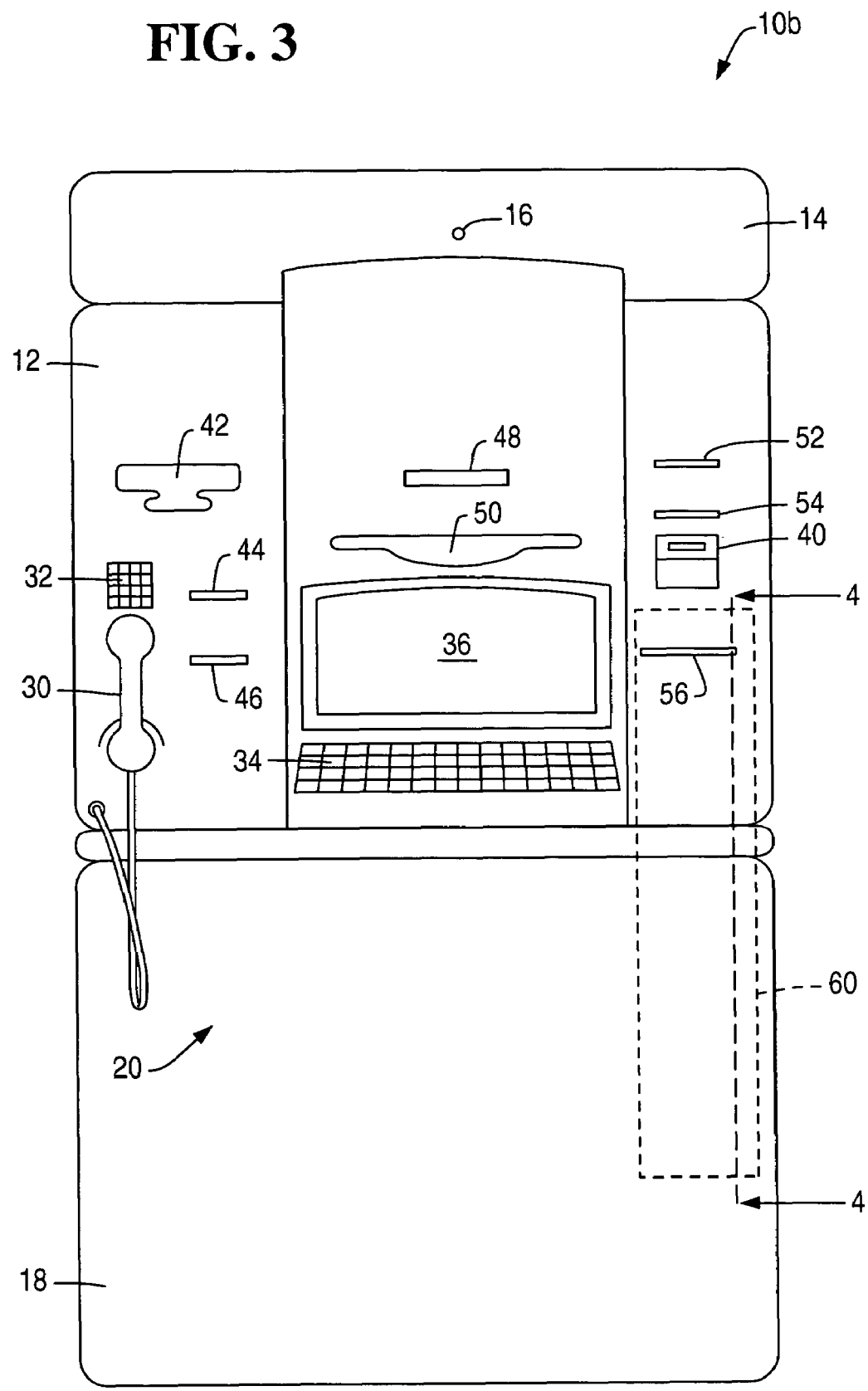
FIG. 3 is a pictorial diagram of another form (an image-based check depositing ATM) of the remote check image capture device of FIG. 1.

Another example of the remote check image capture device 10 is in the form of an image-based self-service depositing terminal, such as an image-based check depositing ATM 10b as shown in FIG. 3, at which a check can be deposited. The check depositing ATM 10b comprises a fascia 12 pivotably coupled to a chassis (not shown), an upper panel 14 mounted to the chassis and defining an aperture 16 through which a camera (not shown) images a customer of the ATM 10, and a lower panel 18 hingeably coupled to the chassis so that the lower panel 18 can be opened to reveal a safe (not shown) mounted in the chassis. When the lower panel 18 is open, the fascia 12 can be pivoted upwards to reveal ATM modules mounted within the chassis.

The fascia 12 and lower panel 18 provide a user interface 20 for allowing an ATM customer to execute a transaction. The fascia 12 includes a handset 30 and a telephone keypad 32 for allowing an ATM customer to contact a remote operator (not shown) typically located in a call center (not shown). The fascia 12 also includes an encrypting keyboard 34 for allowing an ATM customer to enter transaction details, and a display 36 for presenting screens to an ATM customer. The fascia 12 also defines eight slots for receiving and dispensing media items, and a tray 40 into which coins can be dispensed. The slots include a money order printer slot 42, a bunch note input slot 44, a bunch note exit slot 46, a statement output slot 48, a cash dispense slot 50, a card reader slot 52, a card issue slot 54, and a check input/output slot 56. The slots 42 to 56 and tray 40 are arranged so that when the fascia 12 is closed, the slots and tray align with corresponding ATM modules mounted within the ATM's chassis (not shown). The user interface features described above are all provided on an NCR PERSONAS (trade mark) 5878 financial services center ATM, available from NCR Financial Solutions Group Limited, Discovery Centre, 3 Fulton Road, Dundee, DD2 4SW, Scotland.

Figure 4:
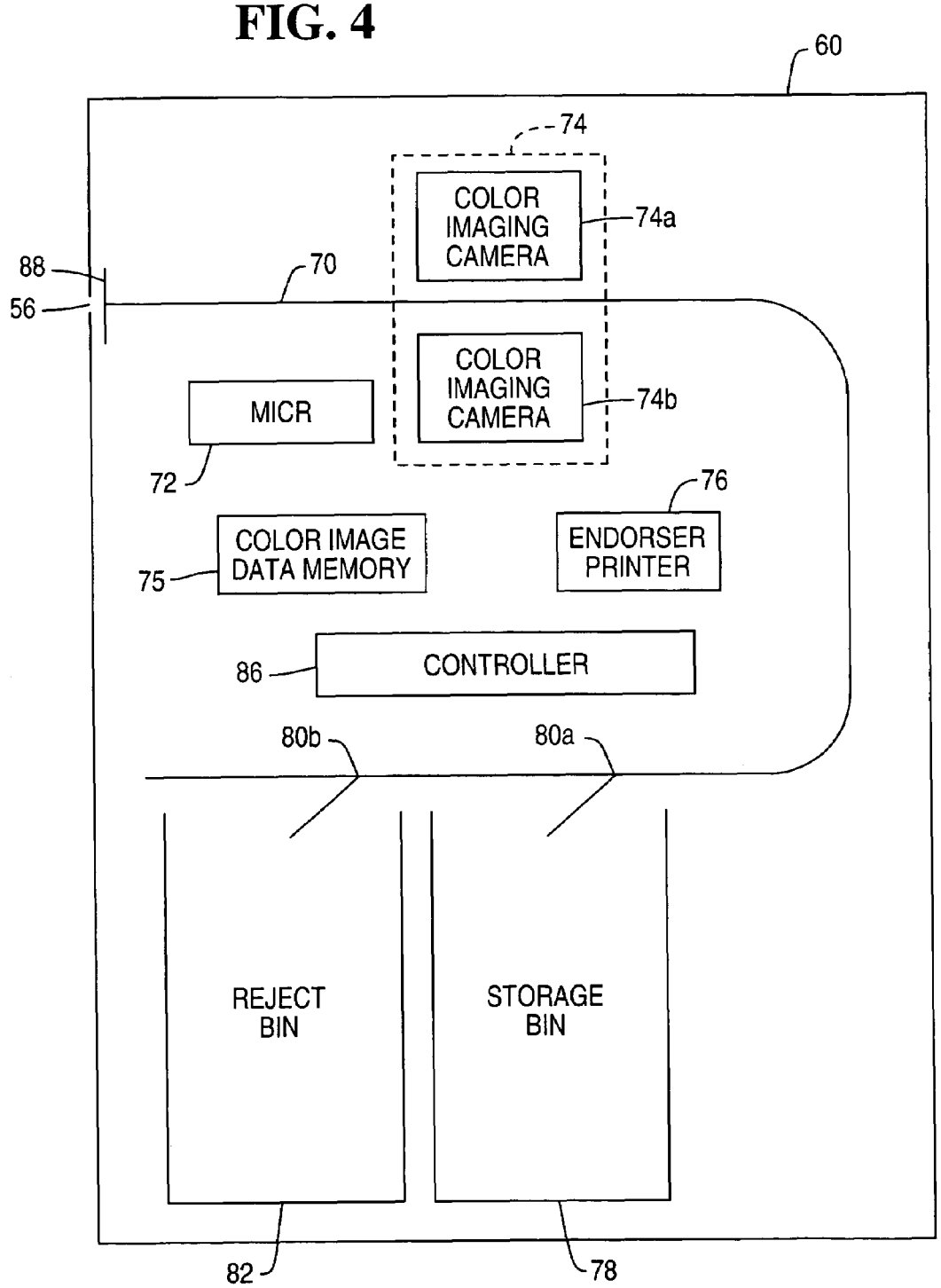
FIG. 4 is a simplified schematic sectional diagram, taken approximately along line 4-4 in FIG. 3, and showing a part (a check processing module) of the ATM of FIG. 3.
Figure 5:
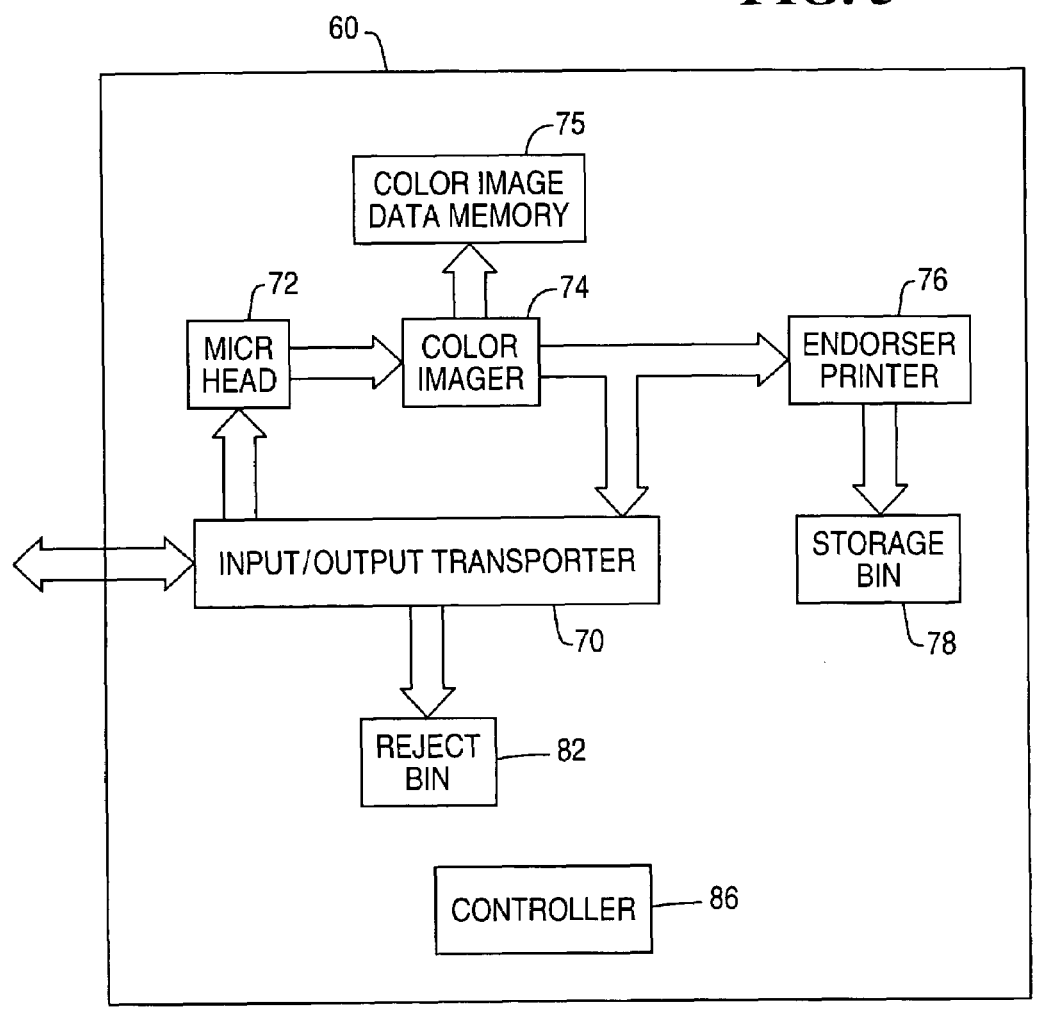
FIG. 5 is a block diagram of the check processing module of FIG. 4.

A check processing module (CPM) 60 will now be described with reference to FIG. 4 and FIG. 5. FIG. 4 is a simplified schematic sectional diagram (along line 4-4 in FIG. 3) showing part of the fascia 12 and lower panel 18, and the main parts of the CPM 60. FIG. 5 is a block diagram illustrating the main elements in the CPM 60. The CPM 60 is a modified version of a conventional check processing module, such as the check processing module provided with the PERSONAS (trade mark) 5878 NCR ATM.

The CPM 60 comprises the following elements: a check input/output transport mechanism 70 including an alignment mechanism for aligning a check; a MICR head 72 for reading magnetic details on a code line of a check; a color imager 74 including an upper 74a and lower 74b color imaging camera for capturing a color image of each side of a check (front and rear); a color image data memory 75 for storing color images of checks; a printer 76 for endorsing a check; a storage bin 78 for storing processed checks; and a reject bin 82 for storing rejected checks. The transport mechanism 70 includes two divert gates 80a, 80b for diverting checks to either the storage bin 78 or the reject bin 82. The elements are conventional and will not be described in detail herein. The CPM 60 also includes a controller 86 for controlling the operation of the elements within the CPM 60. The CPM 60 also includes a slot entrance shutter 88 for opening and closing the check input/output slot 56.

Figure 6A:
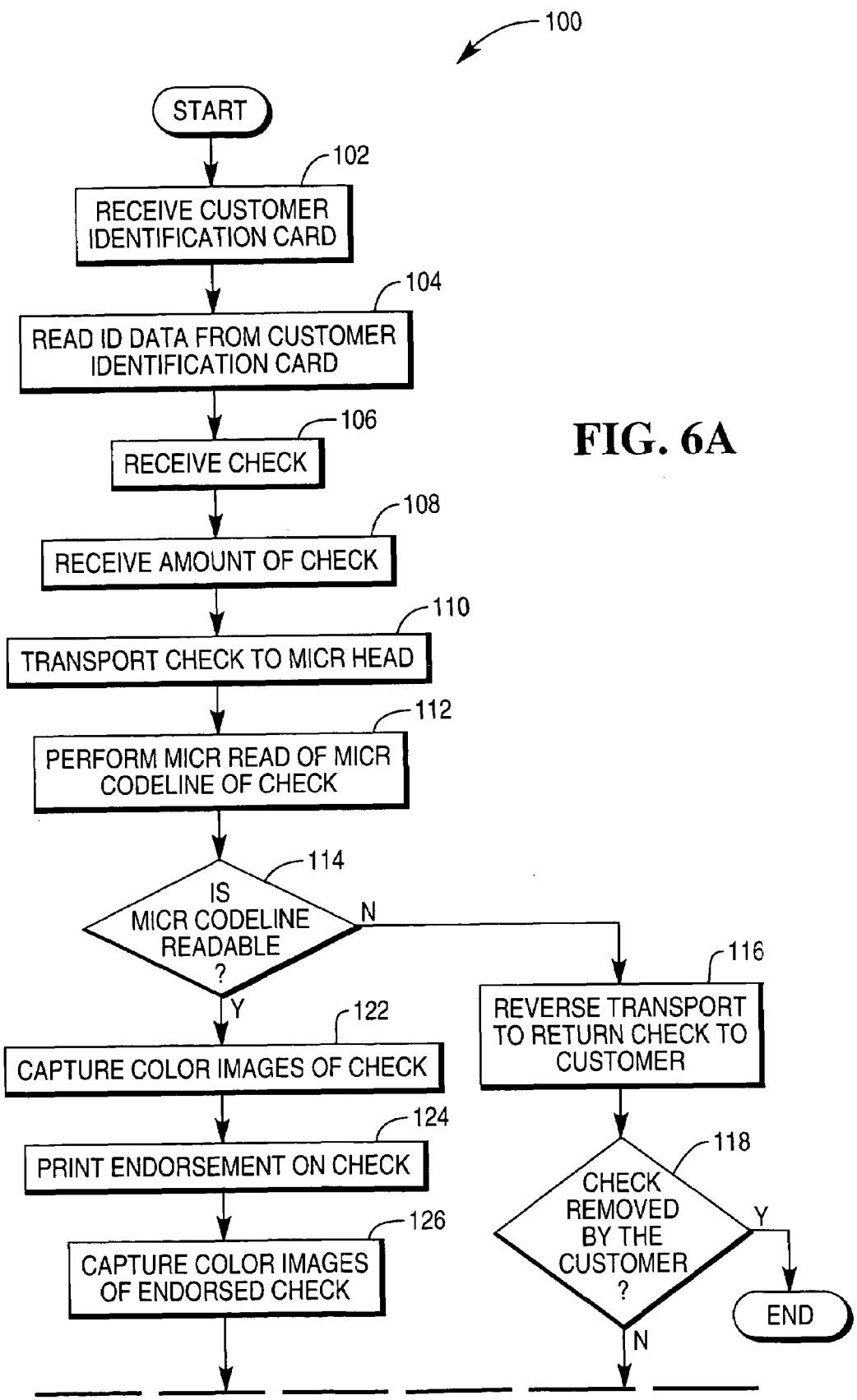
FIG. 6 is a flowchart illustrating steps involved in a check depositing operation.
Figure 6B:
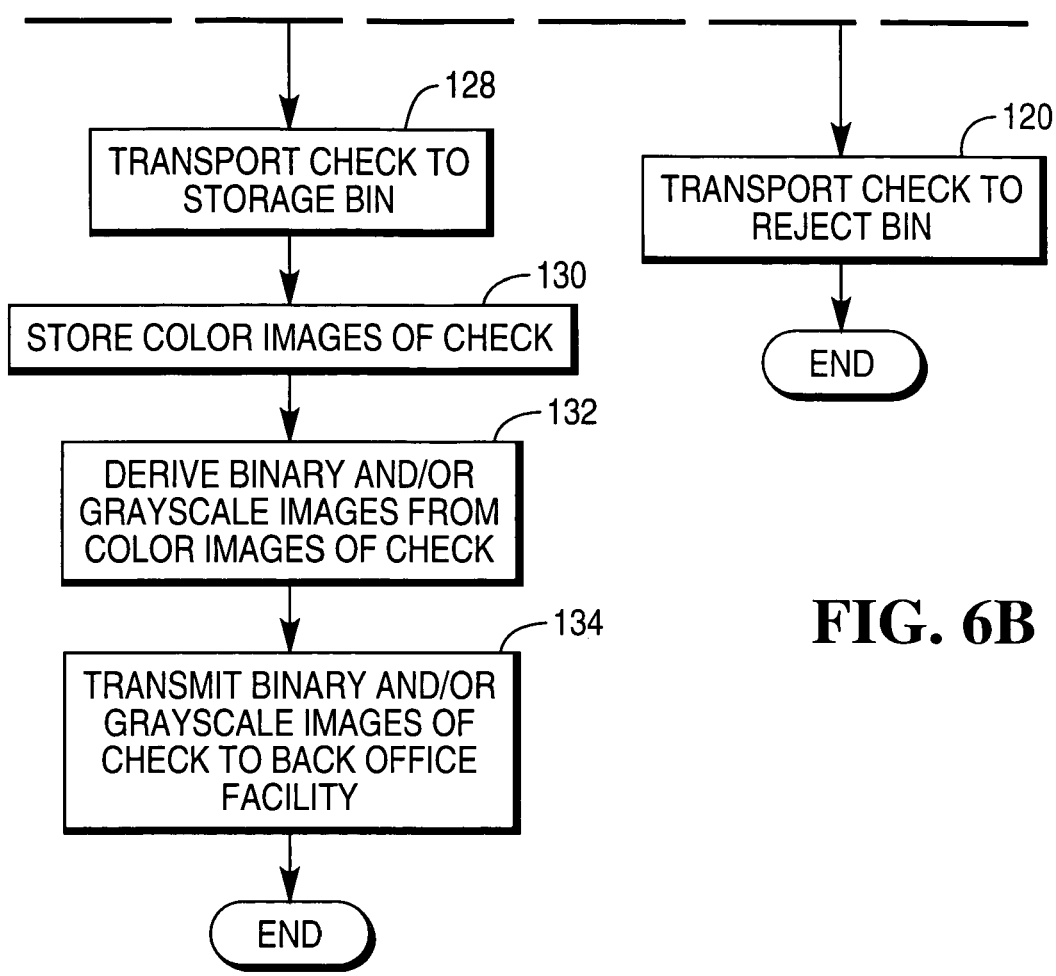

A typical check depositing transaction will now be described with reference to FIG. 6 which is a flowchart 100 illustrating the steps involved in a check depositing transaction, and also with reference to FIGS. 3 to 5. In this transaction, the ATM customer enters a customer identification card into the card reader slot 52 (steps 102 and 104), selects "check depositing" from a list of transaction options presented on the display 36, enters the amount of the check via the keyboard 34, and inserts the check to be deposited through the check input/output slot 56 (step 106). The controller 86 receives the amount of the check (step 108), and opens the slot entrance shutter 88. The transport mechanism 70 receives the check and transports the received check (step 110) to the MICR head 72 where the MICR codeline on the check is read (step 112).

A determination is made (step 114) as to whether the MICR codeline can be read from the check. If the MICR codeline data from the check is unreadable as determined in step 114, then a check return operation is initiated. When this occurs, the transport mechanism 70 reverses the direction of transport (step 116) to convey the check to the check input/output slot 56 to return the check to the ATM customer via the check input/output slot. The controller 86 may monitor the slot 56 to ensure that the check has been removed by the ATM customer (step 118). If the ATM customer has not removed the check within a predetermined time period, the check is retracted and conveyed to the reject bin 82 (step 120).

However, if the MICR codeline data from the check is readable as determined in step 114, then the transport mechanism 70 transports the check to the color imager 74, where both sides of the check are imaged (step 122). The printer 76 prints endorsement data onto the check (step 124). The check is then transported to the color imager 74 to image the endorsed check (step 126) before it is transported to the storage bin 78 (step 128) for subsequent collection and further processing. Although the above describes both steps 122 and 126 being performed, it is conceivable that only one of these steps be performed. Preferably, step 122 is performed, and step 126 is optionally performed.

The color images are stored in the color image data memory 75 (step 130). The color images may be stored locally to the ATM 10. For example, the color images may be stored on an ATM hard drive located within the ATM 10 for a period of time determined by the financial institution. Binary and/or grayscale images are derived from the color images of the check (step 132). A front binary image is derived from the front color image, and a rear grayscale image is derived from the rear color image. There are known techniques to derive binary images from color images. Also, there are known techniques to derive grayscale images from color images.

Accordingly, details of such techniques will not be discussed. The binary and/or grayscale images derived in step 132 are electronically transmitted to the back office facility 90 of an institution (step 134), such as a financial institution in the form of a bank, for further processing at the back office facility. This institution may or may not own the particular ATM at which the check has been deposited.

Figure 7A:
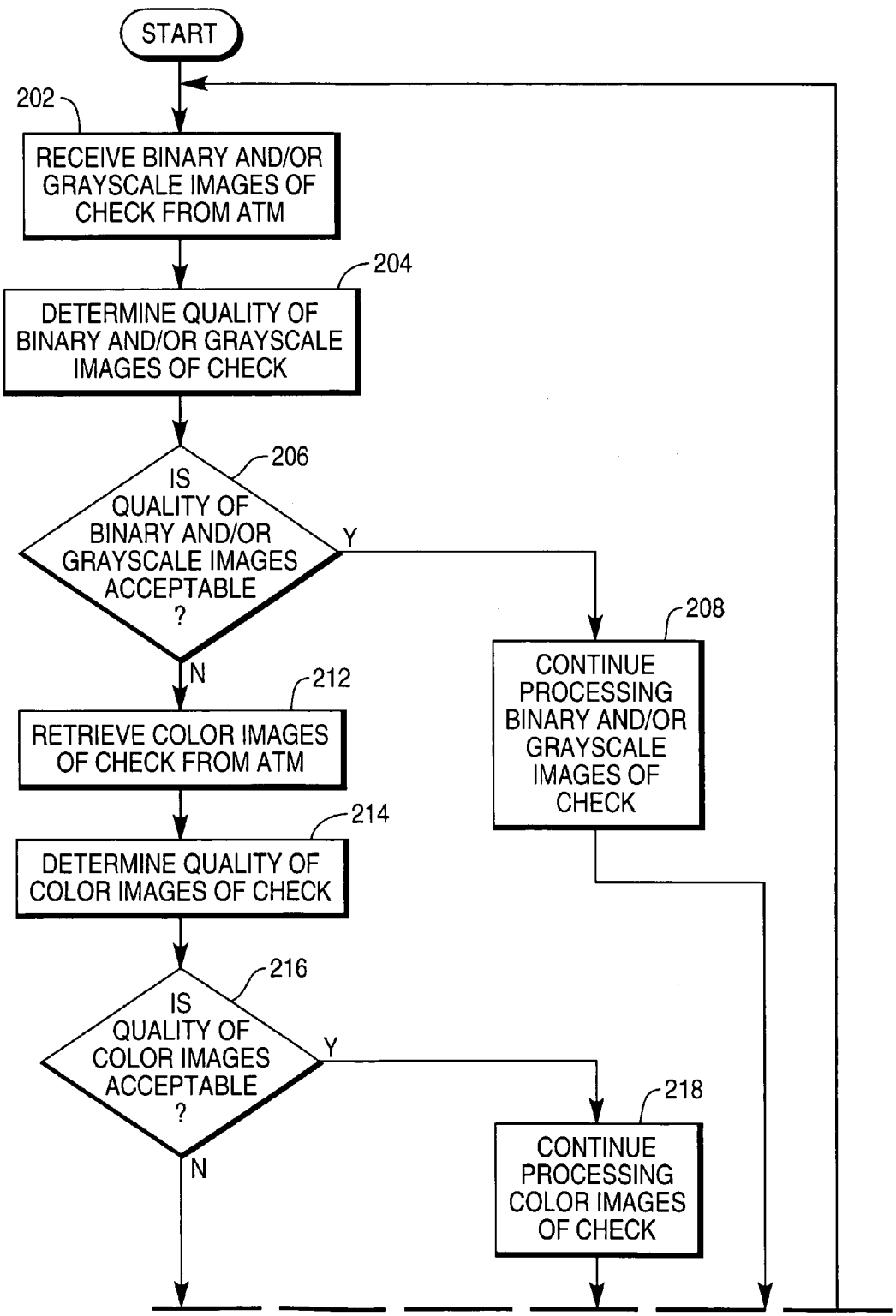
FIG. 7 is a flowchart illustrating steps involved at the back office facility of the institution of FIG. 1.
Figure 7B:
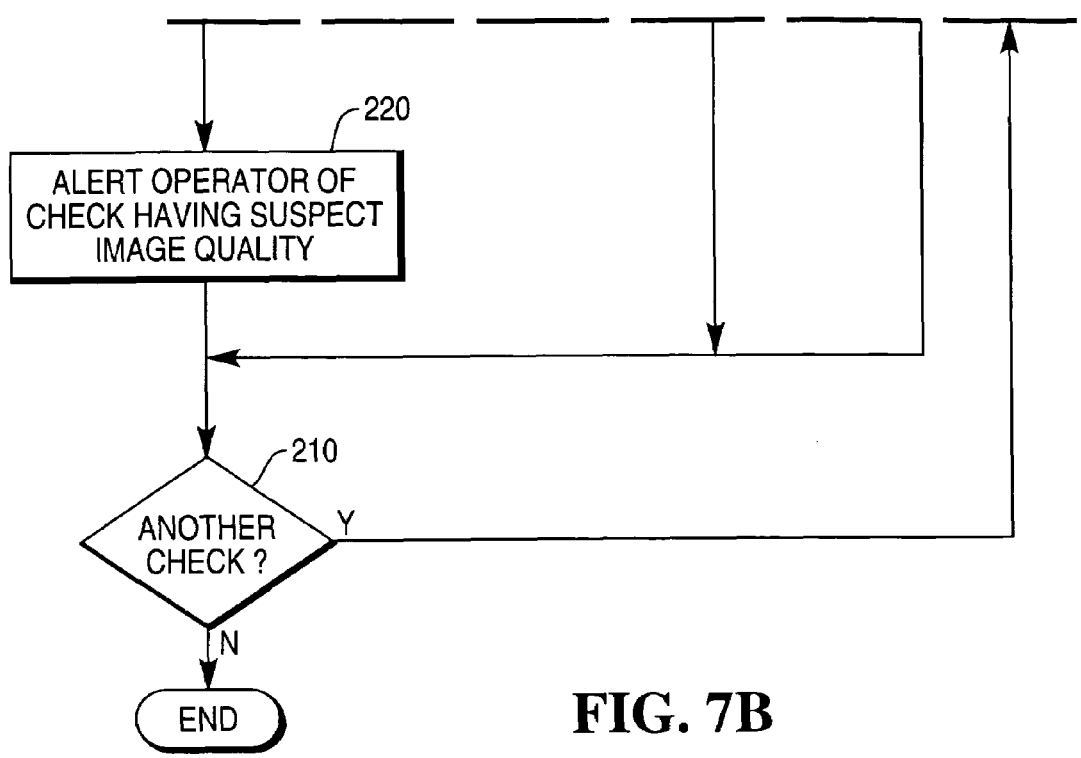

Referring to FIG. 7, a flowchart 200 which illustrates steps performed at the back office facility 90 of the institution which receives the binary and/or grayscale images from the ATM 10b. In step 202, the binary and/or grayscale check images are received from the ATM 10. The quality of the binary and/or grayscale check images is determined in step 204. There are known techniques to determine quality of the binary and/or grayscale check images. Accordingly, details of such techniques will not be discussed.

A determination is made in step 206 as to whether the quality of the binary and/or grayscale check images is acceptable. If the determination in step 206 is affirmative, the binary and/or grayscale check images are processed in usual normal manner (step 208). A determination is then made in step 210 as to whether there is another check to be processed. If affirmative, the next check is processed starting again at step 202.

However, if the determination in step 206 is negative, the color check images which have been stored in the color image data memory 75 by the ATM 10b are retrieved (step 212). The particular color check images retrieved correspond to the binary and/or grayscale check images just processed. The quality of the retrieved color images is determined in step 214. There are known techniques to determine quality of the color check images. Accordingly, details of such techniques will not be discussed. Alternatively, it is conceivable that the quality of the color check images be manually determined by an operator viewing the color check images on a display screen. The specific manner in which the quality of the color check images is determined is not important to different embodiments of the present invention.

A determination is then made in step 216 as to whether the quality of the color check images is acceptable. If the determination in step 216 is affirmative, the color check images are processed (step 218) in a manner so that the corresponding check associated with these color check images need not have to be processed as an exception item (step 218). A determination is then made in step 210 as to whether there is another check to be processed. If affirmative, the next check is processed starting again at step 202.

However, if the determination in step 216 is negative, the retrieved color check images are presented to an operator (step 220) to alert the operator that the corresponding physical check associated with these color check images may need to be processed as an exception item since neither the binary check images nor the color check images is determined to be of acceptable quality. The operator then takes steps to determine if a service operator needs to be dispatched to the particular ATM (in this case the ATM 10b) to retrieve the corresponding physical check. A determination is then made in step 210 as to whether there is another check to be processed. If affirmative, the next check is processed starting again at step 202.

Although the above description describes a back office facility of an institution retrieving color check images as a result of suspect and/or problematic binary and/or grayscale check images being identified during image quality analysis (IQA), it is conceivable that the institution may wish to retrieve color images of checks for other purposes. For examples, the institution may wish to retrieve color check images from the ATM 10b when the binary and/or grayscale check images are not usable for onward processing or a returned check item needs a higher quality image for research purposes. In these examples, the institution can access the color check images and retrieve only those color check images needed to address the issue at hand.

Also, although the above description describes the image quality of the binary and/or grayscale check images being determined at a back office facility of an institution, it is conceivable that the image quality of the binary and/or grayscale check images be determined locally to an ATM. If image quality of the binary and/or grayscale check images is determined locally to an ATM, there should be only minimal additional overhead needed in setting up a system to allow individual color check images to be retrieved. This is because such ATMs are usually already network-connected for remote monitoring, software downloading, and software management.

Also, although the above-description describes suspect image quality as being image quality associated with check images of the binary type and/or the grayscale type, it is conceivable that suspect image quality may be associated with check images of another type or types. It is also conceivable that suspect image quality may be associated with check images of any combination of different types.

Further, although the above-description describes a check being deposited in its entire amount by an ATM customer, it is conceivable that the check may be deposited only in partial amount of the entire amount of the check at the ATM 10b, with the remaining amount of the check being cashed and delivered to the ATM customer. Checks may be of different sizes, different thicknesses, or different weights of paper.

Also, although the above-description describes the PERSONAS (trade mark) 5878 NCR ATM embodying the present invention, it is conceivable that other models of ATMs, other types of ATMs, or other types of self-service terminals may embody the present invention. Self-service terminals are generally public-access devices that are designed to allow a user to conduct a transaction or to access information in an unassisted manner and/or in an unattended environment. Self-service terminals typically include some form of tamper resistance so that they are inherently resilient. Self-service terminals allow users to obtain information or to conduct a transaction. Self-service terminals include: ATMs; non-cash kiosks that allow users to access information (e.g., to view reward points on a reward card the user inserts into the self-service terminal); and kiosks that accept payment for services (e.g. Web surfing kiosks, kiosks that allow users to buy goods, etc.). The term self-service terminal has a relatively broad meaning and includes vending machines.

Further, although the above-description describes the remote check image capture device 10 (FIG. 1) as being in the form of the color image-based check depositing ATM 10b (FIG. 3), the remote check image capture device may be in other forms. As previously mentioned with reference to FIG. 2, the remote check image capture device 10 may comprise a table-top check processing terminal 10a which is located at a bank branch or at a merchant's office facility at which check image capture processing is performed. The merchant's office facility may be a corporate-type of office facility.

The above locations are only examples of where the table-top check processing terminal 10a can be used. The table-top check processing terminal 10a may be used in other locations at which color images of original physical checks are captured. As another example, the table-top check processing terminal 10a may be located at a first bank (which may be a relatively smaller bank), and the back office facility for processing or clearing checks may comprise a second bank (which may be a relatively larger bank). Still as another example, the table-top check processing terminal 10a may be located at any type of bank, and the back office facility may comprise a third party check processing service provider.

The location of the remote check image capture device 10 is remote from the back office facility 90 such that it would be relatively costly for a service operator to be dispatched to the location of the remote check image capture device to retrieve a physical check. The remote check image capture device 10 is located at the point of presentment of an original check. The point of presentment is distant and away from the paper or check clearing facility which processes checks.

It should be apparent that an institution, such as a bank, can retrieve a color image of a check when the image quality of a binary and/or grayscale image of the check as originally received from the ATM 10b is determined to be suspect and/or problematic. The institution does not have to dispatch a service operator to the ATM 10b to the location of the remote check image capture device 10 to retrieve the physical check to process the check as an exception item. The institution simply needs to retrieve the color image which has been previously captured and stored in the color image data memory 6, 75, as described hereinabove. The result is that the particular item in question need not be placed through an exception process. The need to visit the location of the remote check image capture device 10 to retrieve suspect and/or problematic checks is eliminated, or at least reduced if not eliminated. Moreover, in the instance of the embodiment of the ATM 10b, the ATM customer may be credited with the amount of the item without any further delay, even though the image quality of the binary and/or grayscale check image which has been derived during the "first pass" through the ATM has been determined to be suspect and/or problematic.

The particular arrangements disclosed are meant to illustrative only and not limiting as to the scope of the invention. From the above description, those skilled in the art to which the present invention relates will perceive improvements, changes and modifications. Numerous substitutions and modifications can be undertaken without departing from the true spirit and scope of the invention. Such improvements, changes and modifications within the skill of the art to which the present invention relates are intended to be covered by the appended claims.

What is claimed is:

1. A method of operating a publicly accessible image-based check depositing automated teller machine (ATM), the method comprising:
   receiving a check from an ATM customer conducting a check depositing transaction at the ATM;
   capturing a color image of the check provided by the ATM customer conducting the check depositing transaction at the ATM;
   storing the color image of the check at the ATM;
   deriving from the color image a non-color image of the check;
   transmitting to an institution the non-color image of the check;
   receiving from the institution a request to retrieve the color image of the check in response to the institution determining that the non-color image of the check is unusable;
   retrieving the color image of the check in response to the request received from the institution; and
   transmitting the retrieved color image of the check to the institution to fulfill the request from the institution.

2. A method according to claim 1, wherein the non-color image of the check comprises a binary image of the check.

3. A method according to claim 1, wherein the non-color image of the check comprises a grayscale image of the check.

4. A method of operating a publicly accessible image-based check depositing automated teller machine (ATM), the method comprising:
   receiving a check from an ATM customer conducting a check depositing transaction at the ATM;
   capturing a color image of the check provided by the ATM customer conducting the check depositing transaction at the ATM;
   storing the color image of the check locally to the ATM;
   deriving a binary image of the check from the color image of the check;
   transmitting to an institution the binary image of the check;
   receiving from the institution a request to retrieve the color image of the check in response to the institution determining that image quality of the binary image of the check is suspect;
   retrieving the color image of the check which is stored locally to the ATM; and
   transmitting the retrieved color image of the check to the institution to fulfill the request from the institution.

5. An automated teller machine (ATM) comprising:
   a cash dispenser for dispensing cash to an ATM customer when the ATM customer is conducting a cash withdrawal at the ATM;
   a color imaging camera for capturing a color image of a check deposited by an ATM customer when the ATM customer is conducting a check depositing transaction at the ATM;
   a check image data memory for storing the color image of the check; and
   a controller for (i) deriving from the color image a non-color image of the check, (ii) transmitting to an institution the non-color image of the check, (iii) receiving from the institution a request to retrieve the color image of the check from the check image data memory in response to the institution determining that image quality of the non-color image of the check transmitted thereto is suspect, (iv) retrieving the color image of the check from the check image data memory in response to the request received from the institution, and (v) transmitting the retrieved color image of the check to the institution to fulfill the request from the institution.

6. An ATM according to claim 5, further comprising (i) a number of check storage bins, and (ii) a check transport mechanism for transporting a check to a check storage bin after the color imaging camera has captured a color image of the check.

* * * * *

UNITED STATES PATENT AND TRADEMARK OFFICE
CERTIFICATE OF CORRECTION

PATENT NO. : 7,639,859 B2
APPLICATION NO. : 11/243676
DATED : December 29, 2009
INVENTOR(S) : Carreon et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 843 days.

Signed and Sealed this

Twenty-first Day of December, 2010

David J. Kappos
*Director of the United States Patent and Trademark Office*